United States Patent
Shah

(10) Patent No.: US 7,412,446 B2
(45) Date of Patent: Aug. 12, 2008

(54) METHOD, SYSTEM AND STORAGE MEDIUM FOR PROVIDING SUPPLIER BRANDING SERVICES OVER A COMMUNICATIONS NETWORK

(75) Inventor: Tulip Shah, Novi, MI (US)

(73) Assignee: Delphi Technologies, Inc., Troy, MI (US)

( * ) Notice: Subject to any disclaimer, the term of this patent is extended or adjusted under 35 U.S.C. 154(b) by 962 days.

(21) Appl. No.: 10/080,423

(22) Filed: Feb. 22, 2002

(65) Prior Publication Data

US 2003/0163471 A1    Aug. 28, 2003

(51) Int. Cl.
*G06F 17/30* (2006.01)
(52) U.S. Cl. ............................................. 707/10
(58) Field of Classification Search ............. 707/1, 707/2, 530, 10, 104.1; 705/26; 709/219, 709/204
See application file for complete search history.

(56) References Cited

U.S. PATENT DOCUMENTS

| | | | |
|---|---|---|---|
| 2002/0055911 A1* | 5/2002 | Guerreri | 705/64 |
| 2002/0062262 A1* | 5/2002 | Vasconi et al. | 705/26 |
| 2002/0138527 A1* | 9/2002 | Bell et al. | 707/530 |
| 2003/0074424 A1* | 4/2003 | Giles et al. | 709/219 |

OTHER PUBLICATIONS

Covisant History, www.covisint.com, Dec. 17, 2001, 3 pages.
Covisint Corporate, www.covisint.com, Dec. 17, 2001, 1 page.
Covisint Portal, www.covisint.com, Dec. 17, 2001, 2 pages.

* cited by examiner

*Primary Examiner*—Etienne P LeRoux
(74) *Attorney, Agent, or Firm*—Michael D. Smith

(57) ABSTRACT

An exemplary embodiment of the invention relates to a method, system and storage medium for providing supplier branding services over a communications network. The system comprises an information exchange system including a server in communication with a data storage device via a communications link. The server executes web server software for hosting and serving web pages and applications software including a branding tool for creating and disseminating branded information. The data storage device houses a database storing supplier subscription records for facilitating portal services. The supplier subscription records include customer target records. The database also stores customer profile records. The system also includes a link to an enterprise portal site of a registered customer system; and a link to a subscribing supplier system. The branding tool maps the branded information provided in the supplier subscription records to profile information provided in the customer profile records and transfers the resulting targeted branded information to the customer system. The invention also includes a method and storage medium for facilitating the implementation of the supplier branding services.

21 Claims, 3 Drawing Sheets

US 7,412,446 B2

METHOD, SYSTEM AND STORAGE MEDIUM FOR PROVIDING SUPPLIER BRANDING SERVICES OVER A COMMUNICATIONS NETWORK

BACKGROUND

The present invention relates generally to business-to-business marketing services, and more particularly, to a method, system, and storage medium for providing supplier branding services over a communications network.

Many businesses have recently begun opening up their system firewalls to receive email messages from external sources. While there are obvious advantages in allowing outside information into a business, the reported inundation of unsolicited information has often resulted in overburdened system storage devices, diminished processing speeds, and sometimes overwhelmed system users. Accumulating junk mail (e.g., spam) can quickly consume system resources in a given network, slowing down the users' ability to retrieve important information which can further lead to diminished productivity as users sift through this sea of information An increasing number of companies are beginning to implement enterprise portals for their employees, including personalized home pages similar to MY YAHOO™ in the public domain. Portals are World Wide Web (WWW) sites that are used as a starting point for users upon connecting to the web or are WWW sites that users visit as an anchor site upon connecting to the web. A portal may be set as a default homepage for users who employ a browser program that includes the homepage. Enterprise portals make it possible for employees to become more productive, by filtering out unwanted information and organizing the barrage of electronic data that inundate their desks each day. However, for suppliers faced with the challenge of one-to-one marketing (e.g., marketing engineering, design, purchasing, production control, logistics, etc.) with the employees of this type of customer organization, these enterprise portals provide both a challenge and a unique opportunity for suppliers to provide branded and timely messages to targeted constituencies within the customer organization. Customer employees could benefit by receiving tailored information to assist them in doing their jobs more effectively.

Recently, Industry Exchanges (IE), (e.g., Covisint™, Transora™, etc.), have been established as trusted third-party systems that facilitate information exchange, particularly for the buyer or customer side. Covisint™ is a business-to-business (B2B) exchange geared toward the automobile industry. It provides product development, procurement, and supply chain management collaboration capabilities for its members via a web-architected information portal. Transora™ is a similar system geared toward the consumer packaged goods industry. Currently, there are no known solutions that provide and manage supplier-branded marketing and related services to targeted constituencies within a customer organization utilizing information exchanges.

The above discussed and other drawbacks and deficiencies of the prior art are overcome or alleviated by the supplier branding tool of the invention.

SUMMARY

An exemplary embodiment of the invention relates to a method, system and storage medium for providing supplier branding services over a communications network. The system comprises an information exchange system including a server in communication with a data storage device via a communications link. The server executes web server software for hosting and serving web pages and applications software including a branding tool for creating and disseminating branded information and sales collateral. The data storage device houses a database storing supplier subscription records for facilitating portal services. The supplier subscription records include customer target records. The database also stores customer profile records. The system also includes a link to an enterprise portal site of a registered customer system; and a link to a subscribing supplier system. The branding tool maps the branded information and sales collateral provided in the supplier subscription records to profile information provided in the customer profile records and transfers the resulting targeted branded information to the customer system. The invention also includes a method and storage medium for facilitating the implementation of the supplier branding services.

BRIEF DESCRIPTION OF THE DRAWINGS

Referring to the exemplary drawings wherein like elements are numbered alike in the several Figures.

DETAILED DESCRIPTION

The supplier branding tool provides a singular focal point for managing marketing and related information and communications amongst buyers and sellers within an industry sector. In an exemplary embodiment, the supplier branding tool is implemented in conjunction with an information exchange system. The exchange may be a public exchange similar to commercial web portals such as Yahoo™ or MSN™, or may be a fee-based membership system, such as Covisint™. Further, the exchange may be limited in scope to a single industry, such as automotive, or may extend beyond a single industry to provide a variety of categorized services to a wide range of industries.

Figure 1:
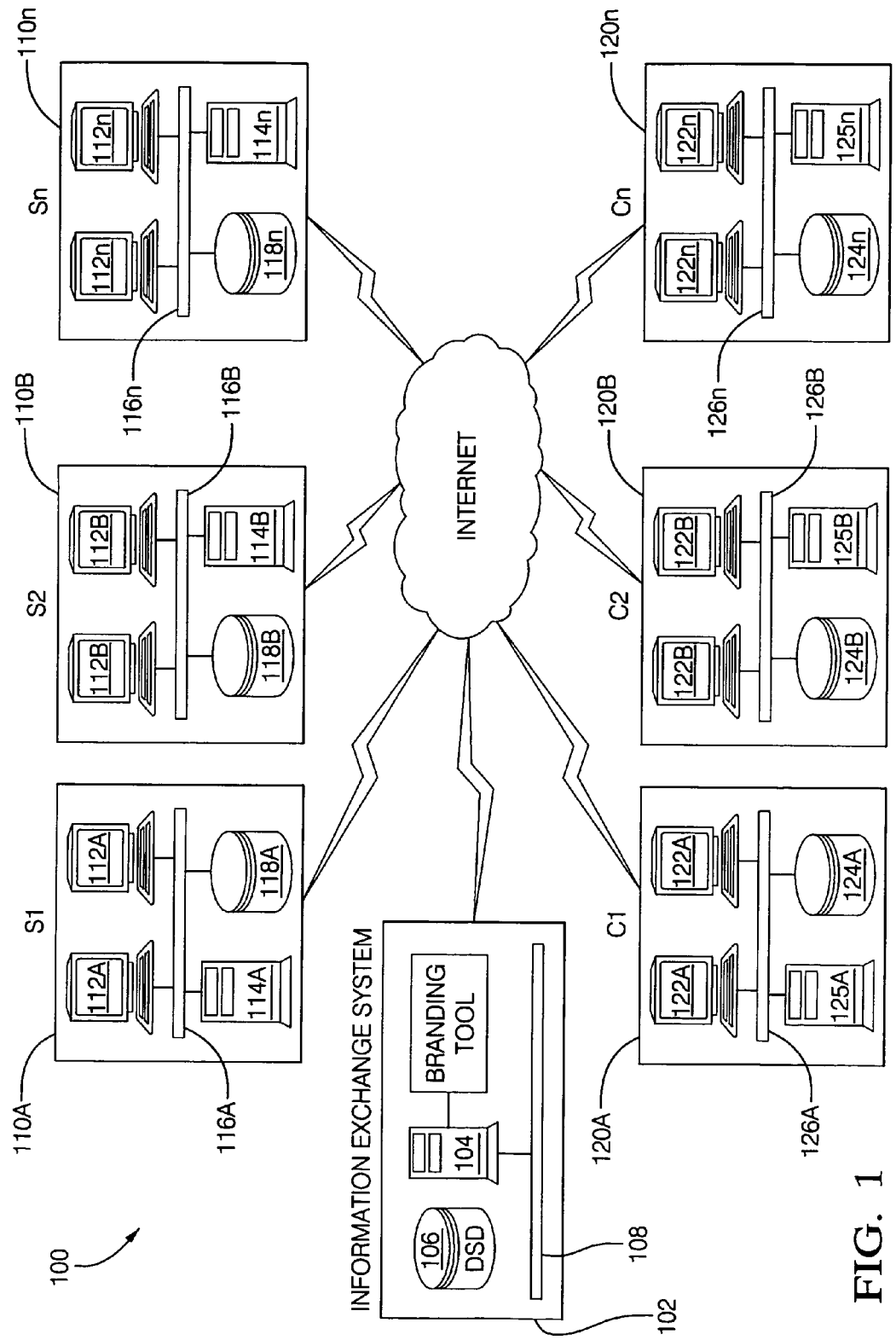
FIG. 1 is a system diagram of a computer network for implementing the supplier branding tool in an exemplary embodiment.

An exemplary network system 100 upon which the invention might be used is shown in FIG. 1. Referring to FIG. 1, a system 100 is provided and includes information exchange system 102 representing a business-to-business (B2B) web portal. Information exchange system 102 comprises a server 104 in communication with a data storage device 106 via a communications network 108. Communications network 108 may comprise an infrastructure such as an intranet network operating on a local area network (LAN). Further, network 108 may be connected to the Internet via server 104.

Server 104 includes web server software for hosting and serving web pages of information exchange system 102. Server 104 also includes applications software for facilitating activities such as initiating customer registration, authorizing access to information exchange system's 102 applications, directing visitor requests, forwarding data to customer and supplier systems, and accessing databases from data storage device 106 as will be explained further herein.

Server 104 executes the supplier branding tool of the invention. The supplier branding application allows suppliers to create branded information and sales collateral that can be shared with their customers on a customized basis. This information may include corporate brochures, product specifications and usage information, industrial data, technical manuals, user manuals, or any other suitable information. The information may be text based or may include graphics, sound, streaming video, etc.

The branded information and sales collateral provided is metatagged and stored in order to target a particular customer at a specific point in time. The metatagging process allows for the information retrieval by specified individuals, and also prevents dissemination of the information to certain individuals such as a competitor of the supplier of the information.

Server 104 may be configured to periodically collect the branded information from the web servers of subscribing supplier entities 110, and populate the appropriate member customer portal(s) by pushing the information via the supplier-provided meta-tags mapped to corresponding customer profile records.

Data storage device 106 houses one or more databases pertaining to customer registration data, supplier subscription data, supplier billing and reporting, marketing analyses and measurements, and any other information desired by information exchange system 102. Subscribing suppliers provide detailed account information that becomes a part of their subscription records stored in data storage device 106. Supplier subscription records (illustrated in FIG. 2) include customer target records (also illustrated in FIG. 2) that assist the branding tool in coordinating the organization and transmittal of selected target data to appropriate customer portals. Customer profile records (not shown) are also stored in data storage device 106 and include descriptive information provided by a customer/employee relating to the customer entity, job role, technologies and areas of interest. This information is used to facilitate the mapping of customers to suppliers. An interested employee of a customer system may register with information exchange system 102 via the branding tool to receive directed, customized information from one or more of supplier systems 110. For example, during the registration process, a customer employee may indicate that he or she is interested in information about a new technology that is relevant to the employee's job. When information exchange system 102 receives new information from one or more of supplier systems 110 concerning the technology, it retrieves customer target information from target record 204, checks to see if this particular customer employee has been tagged to receive this information from each of the supplier systems, and if so, transmits the information to the customer employee.

Information exchange system 102 may be connected to the Internet via plain old telephone service (POTS), DSL, T-1, ISDN, or other high-speed communications medium known in the art.

Information exchange system 102 may provide enterprise directory services, content management tools, knowledge management tools, collaboration tools (with synchronous and asynchronous capabilities), and appropriate technology for retrieving and pushing data from the repositories of supplier entities 110 hosted at information exchange system 102, to a customer's enterprise portal, which may also be hosted at information exchange system 102. Information exchange system 102 may also provide notification of key customer events and valuable feedback information to supplier entities 110 regarding usage patterns, rating of information, etc. in order to assist suppliers in better tailoring the information being forwarded to targeted customers. It should be noted, however, that the IE hosting of the enterprise portals, both supplier and/or customer-side is not necessary in order to realize the advantages of the invention.

The revenue model for information exchange system 102, as well as the supplier branding tool, may be based upon the amount of information (e.g., kilobytes) and customization pushed by the supplier to the targeted customers. Also as more and more usage is established and the relationship between a customer and supplier matures from information sharing to transaction based, the supplier may find it more beneficial to either utilize IE applications offerings or have IE host-customized applications on its behalf, thus providing expanded benefits and revenue potential for the IE.

Supplier entities 110A-110n, each representing a supplier or vendor company subscribing to the supplier branding tool and information exchange system 102, are also provided in system 100. Each of supplier entities 110 preferably utilize web-enabled computer processing devices such as a general-purpose computer with a web browser program, or alternatively a server, for communicating with information exchange system 102 and other outside entities. For illustrative purposes, each of supplier entities 110A-110n employ workstations 112A-112n, coupled to servers 114A-114n and data storage devices 118A-118n via communications links 116A-116n, respectively. Supplier entities 110A-110n communicate with information exchange system 102 via the Internet, although other network systems may be used as appropriate such as an Extranet network.

Also included in system 100 are customer entities 120A-120n each comprising an enterprise portal protected by a firewall or similar security device. The enterprise portal may be privately developed and maintained or may be hosted by information exchange system 102 or a commercial applications services provider (ASP). The enterprise portal provides each employee at customer entities 120A-120n a personal employee portal for customizing and filtering content received at the enterprise portal. Employees operate workstations 122A-122n coupled to servers 125A-125n via communications links 126A-126n. Customer entities 120A-120n are typically manufacturing businesses that are registered with information exchange system 102 to receive selected information from specified supplier entities.

Workstations 122A-122n may be personal computers (PCs) including input devices such as a keyboard, mouse, etc. Workstations 122A-122n also include an internal and/or external memory unit such as data storage devices 124A-124n, and web browser software capable of communicating with information exchange system 102. Alternatively, a similar web-enabled device may be utilized in lieu of workstations 122A-122n such as a laptop, PDA, or other suitable appliance. System maintenance, purchasing, engineering, and administrative personnel may be typical users of workstations 112A-112n. Data storage devices 124A-124n store customized content, reports, market analyses received from information exchange system 102, as well as any proprietary information desired by customer entities 120A-120n. Alternatively, some data may be housed in data storage device 106 for subsequent query and retrieval by customer entities 120A-120n. Registered representatives at customer entities 120A-120n log on to information exchange system's 102 web site, access a personalized web page, and retrieve selected content via the Internet. Information exchange system's 102 web site (not shown) allows subscribing supplier entities 110A-110n to communicate their marketing data to specific targeted customers.

Customer entities 120A-120n may also receive notification of content to be delivered from information exchange system 102, followed by transmission of the content for storage and subsequent retrieval. Server 104 may also track and audit this information and generate various reports in accordance with business rules adopted by information exchange system 102 and/or involved supplier entities 110.

Information exchange system 102 provides supplier branding services via the Internet to subscribing customer entities 120A-120n utilizing the supplier branding tool. Information exchange system 102 acts as conduit through which suppliers may market products to targeted customers and through which measurements and statistical data are tracked and delivered to the associated subscribing supplier entities.

Figure 2:
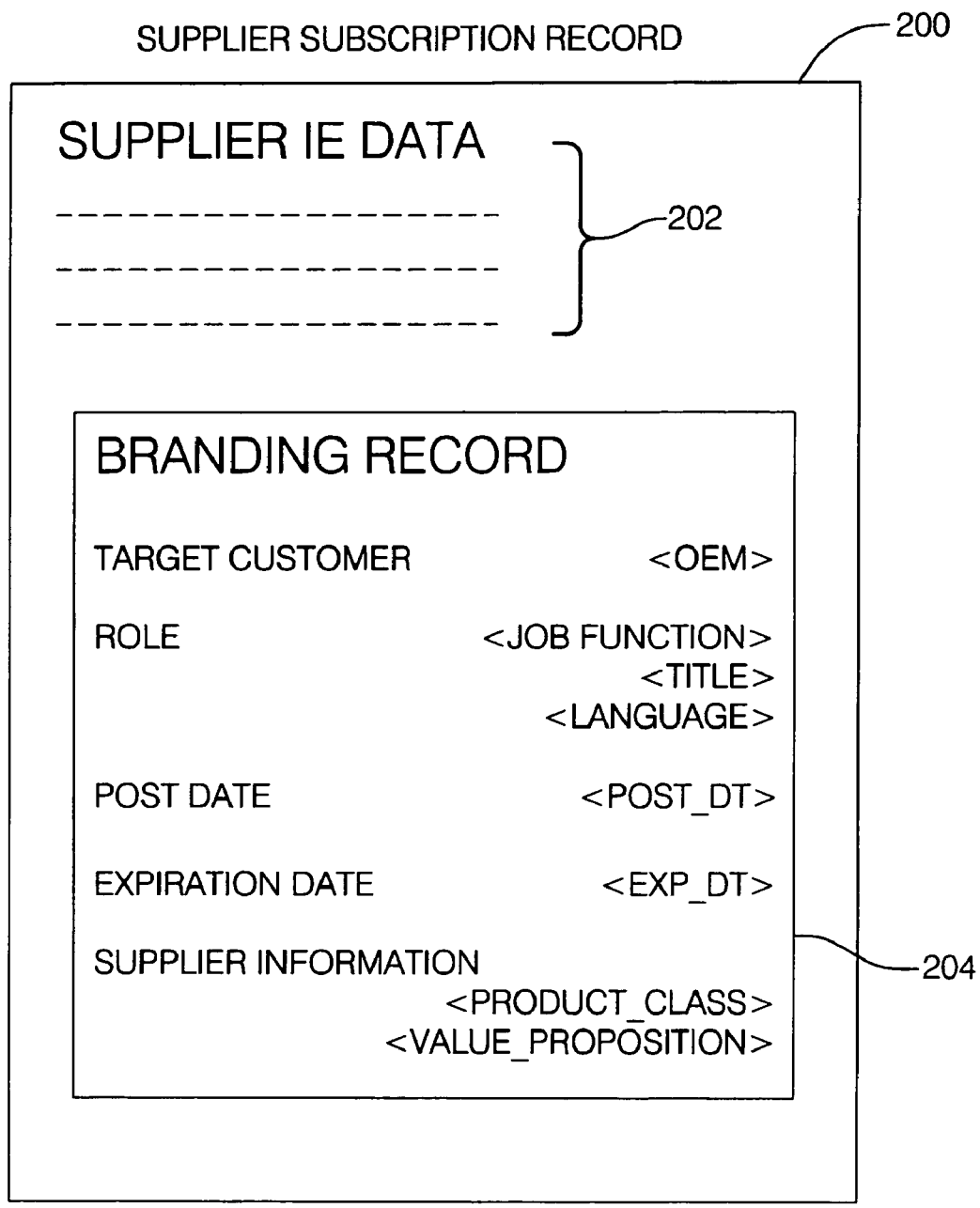
FIG. 2 is a supplier subscription record including a customer target record used by the supplier branding tool in an exemplary embodiment.

FIG. 2 depicts an exemplary supplier subscription record 200 for one of supplier entities 110A-110n. Supplier subscription records are generally used by information exchange system 102 to provide information exchange or portal services to subscribing suppliers. For example, information exchange system 102 may be hosted by Covisint™ whereby a subscribing supplier requests and receives industry information that has been collected, categorized, and stored for future use. The branding tool of the invention may be employed by information exchange system 102 to facilitate additional services using existing information 202 in supplier subscription record 200 and/or data provided in target record 204. Information gathered and stored in target record 204 includes identifying target customer data for one or more of customer entities 120 such as customer name, customer employee name and role including job function, title, language, etc. Also included in target record 204 may be the dates that the branded information is to be posted at the customer site and removed from the target record.

Supplier information targeted for a specific customer may also be included in target record 204 and includes the information that the supplier wishes to convey to the customer. New product offerings, limited time offers, etc., are provided by the supplier via the supplier information field. Other information may include inventory visibility, capacity visibility, engineering capabilities, manufacturing capabilities, product and process technologies, abilities to share program status (e.g., advanced product quality plan (APQP)), etc. Further information such as delivery schedules, commercial terms and conditions, technical white papers, and marketing collateral may also be provided via target record 204.

Once targeted information is received by a customer, opportunities to engage in further communications are made available via the supplier branding tool and information exchange system 102 in order to generate and develop leads. The customer may opt to contact a specific individual at the supplier system via an email link provided to the customer portal or may select a hypertext link to a different web site where more detailed information is available. Alternatively, a call function icon may be presented to the customer whereby telephone contact with a supplier can be initiated.

Figure 3:
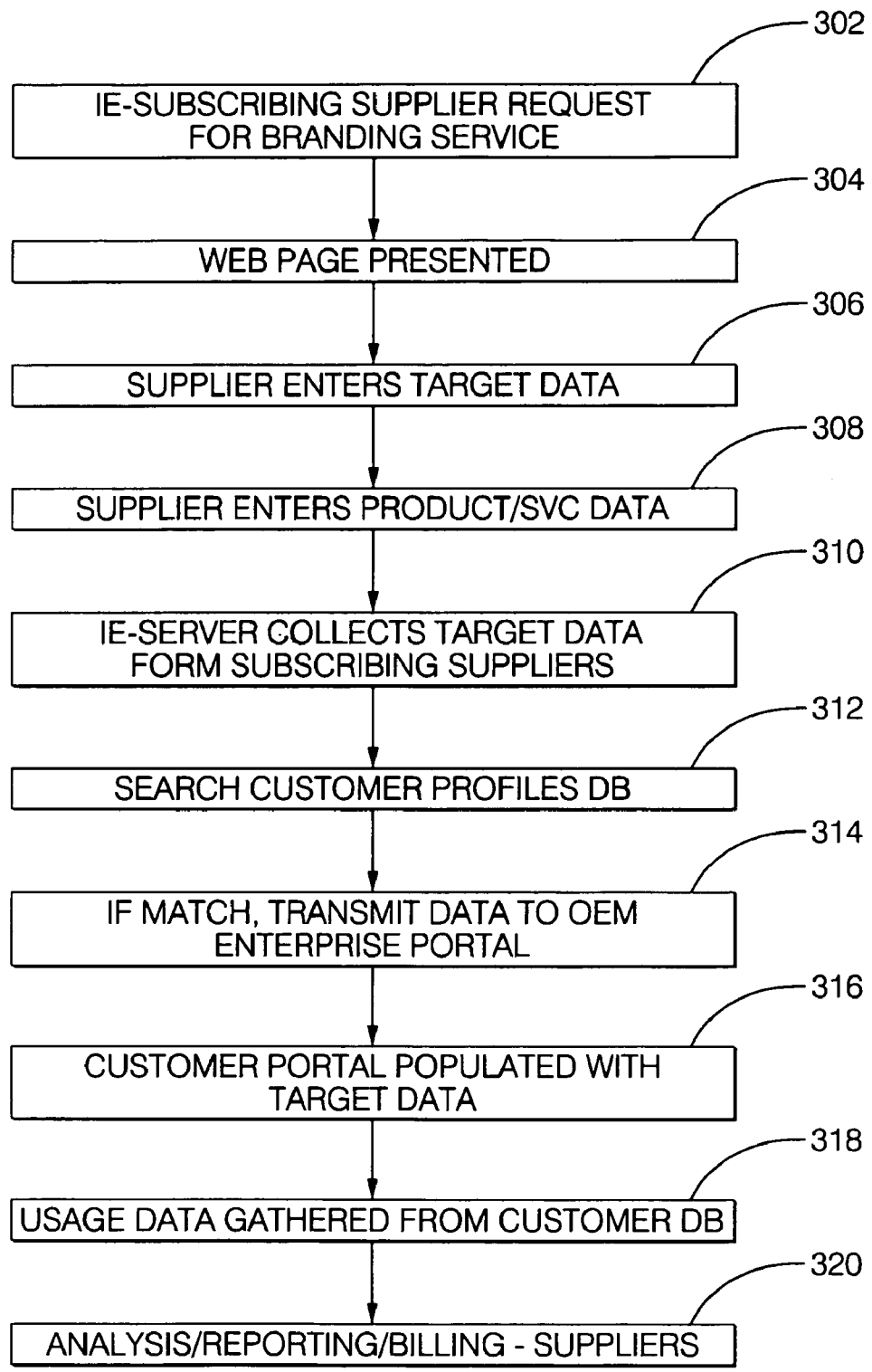
FIG. 3 is a flowchart illustrating the process of implementing the supplier branding tool in an exemplary embodiment.

FIG. 3 describes the process by which a supplier system implements the branding tool of the invention. A subscribing supplier of information exchange system 102 requests to initiate the branding services at step 302. The supplier branding tool presents a web page (not shown) at step 304 requesting information from the supplier. The supplier enters requested target customer data at step 306 which is stored in target record 204. The supplier enters product/service data (e.g., supplier information) at step 308 which is also stored in target record 204. Information exchange server 104 collects target data from subscribing supplier subscription records at step 310. Information exchange server 104 searches customer profile records in data storage device 106 for matching information at step 312. If a match between the supplier information and the customer profile information is found, server 104 retrieves the branded information associated with the target record and transmits it to the appropriate customer entity 120 at step 314 where the data is made available to the customer enterprise portal. The customer enterprise portal distributes the data to the appropriate employee portal at step 316. As described above, employees may be provided the opportunity to initiate contact with the supplier system in order to request further information or engage in various business activities. Usage data is gathered by information exchange server 104 from customer profiles based upon activities conduced by the employees of the customer system which may then be used to generate reports and statistical data at step 318. Commercial tools known in the market can be used to analyze hits and other activity occurring at the web sites involved. This information, as well as billing information is provided to supplier entities 110 via server 104 at step 320. In this manner, the supplier is able to derive a sense of whether the right information is being pushed to the appropriate customers. Explicit methods of gathering information such as customer evaluation forms and/or implicit methods such as navigation activities can be used to examine the effectiveness of the information.

As described above, the present invention can be embodied in the form of computer-implemented processes and apparatuses for practicing those processes. The present invention can also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring to cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An information exchange system for providing supplier branding services, comprising:
   a server in communication with a data storage device via a communications link, said server executing:
      web server software operable for hosting and serving web pages; and
      applications software, including a branding tool operable for creating and disseminating branded information;
   a database associated with said data storage device, said database storing:
      supplier subscription records operable for facilitating portal services, said supplier subscription records including customer target records; and customer profile records;
a link to an enterprise portal site of a registered customer system; and
a link to a subscribing supplier system;
wherein said branding tool maps said branded information provided in said supplier subscription records to profile information provided in said customer profile records and transfers resulting targeted branded information to said customer system.

2. The information exchange system of claim 1, further comprising a means for allowing said customer system to initiate contact with said subscribing supplier system subsequent to receiving said targeted branded information.

3. The information exchange system of claim 1, wherein said server periodically collects said branded information provided via said supplier subscription records and populates a portal web site associated with said registered customer system utilizing metatags provided by said subscribing supplier system.

4. The information exchange system of claim 3, wherein said branding tool utilizes said metatags for preventing dissemination of said branded information to unauthorized systems.

5. The information exchange system of claim 3, wherein said portal web site is hosted by said information exchange system.

6. The information exchange system of claim 1, wherein said applications software includes at least one of:
an enterprise directory service tool;
a content management tool;
a knowledge management tool; and
a collaboration tool.

7. The information exchange system of claim 1, further comprising a means for implementing web site metrics tracking based upon activities conducted by said registered customer system.

8. The information exchange system of claim 7, wherein said branding tool generates and disseminates reports based upon said web site metrics tracking.

9. The system of claim 1, wherein said enterprise portal site includes personal employee web portals for employees of said registered customer system.

10. A method for providing supplier branding services via an information exchange system over a computer network, comprising:
receiving a request to access a branding services tool by a subscribing supplier system;
providing a web page requesting target information and supplier information from said subscribing supplier system;
receiving a response to requested target information and said supplier information;
storing said response in a target record;
associating metatags with response data provided in said target record;
searching a customer profile database for customer profile records matching said metatags provided in said target record;
if a match is found, transmitting associated branded information to a customer system associated with said customer profile records;
gathering usage data from said customer profile records;
generating a report; and
transmitting said report to said subscribing supplier system.

11. The method of claim 10, wherein said target information includes at least one of:

a customer name;
an employee name;
an employee role; and
a time frame for posting branded information at a customer portal.

12. The method of claim 10, wherein said supplier information includes at least one of:
inventory visibility;
capacity visibility;
engineering capabilities;
manufacturing capabilities;
product and process technologies; and
ability to share program status.

13. The method of claim 10, wherein said supplier information includes at least one of:
new product offerings;
limited time offers;
delivery schedules;
commercial terms and conditions;
technical white papers; and
marketing collateral.

14. The method of claim 10, wherein said customer profile records include descriptive information relating:
customer entity;
job role of employee of said customer entity; and
subjects of interest.

15. The method of claim 10, further comprising:
implementing a billing process between said information exchange system and said supplier system based upon volume of activity conducted by said customer system related to said supplier system.

16. A storage medium encoded with machine-readable computer program code
said code including instructions for causing a computer to implement a method for providing supplier branding services via an information exchange system over a computer network, the method, comprising:
receiving a request to access a branding services tool by a subscribing supplier system;
providing a web page requesting target information and supplier information from said subscribing supplier system;
receiving a response to requested target information and said supplier information;
storing said response in a target record;
associating metatags with response data provided in said target record;
searching a customer profile database for customer profile records matching said metatags provided in said target record;
if a match is found, transmitting associated branded information to a customer system associated with said customer profile records;
gathering usage data from said customer profile records;
generating a report; and
transmitting said report to said subscribing supplier system.

17. The storage medium of claim 16, wherein said target information includes at least one of:
a customer name;
an employee name;
an employee role; and
a time frame for posting branded information at a customer portal.

18. The storage medium of claim 16, wherein said supplier information includes at least one of:
inventory visibility;

capacity visibility;
engineering capabilities;
manufacturing capabilities;
product and process technologies; and
ability to share program status.

19. The storage medium of claim 16, wherein said supplier information includes at least one of:
new product offerings;
limited time offers;
delivery schedules;
commercial terms and conditions;
technical white papers; and
marketing collateral.

20. The storage medium of claim 16, wherein said customer profile records include descriptive information relating:
customer entity;
job role of employee of said customer entity; and
subjects of interest.

21. The storage medium of claim 16, wherein said code further comprises instructions for causing said computer to implement:
implementing a billing process between said information exchange system and said supplier system based upon volume of activity conducted by said customer system related to said supplier system.

* * * * *